Figure 2:
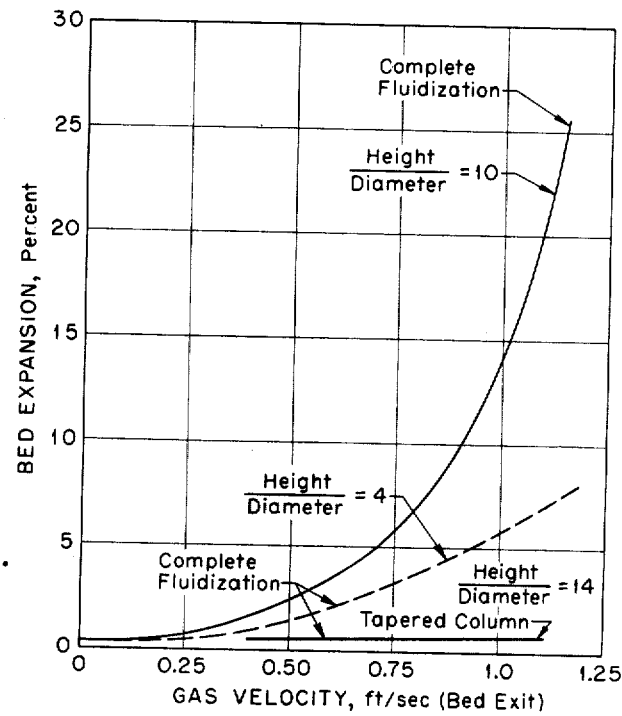

May 3, 1966   R. P. LEVEY   3,249,395
GAS-SOLIDS REACTION SYSTEM
Filed Feb. 20, 1959   2 Sheets-Sheet 1

INVENTOR.
Ralph P. Levey
BY
ATTORNEY

INVENTOR.
Ralph P. Levey

United States Patent Office 3,249,395
Patented May 3, 1966

3,249,395
GAS-SOLIDS REACTION SYSTEM
Ralph P. Levey, Oak Ridge, Tenn., assignor to the United States of America as represented by the United States Atomic Energy Commission
Filed Feb. 20, 1959, Ser. No. 794,787
3 Claims. (Cl. 23—1)

My invention relates in general to gas-solids reaction systems and more particularly to fluidized bed reactors.

In fluidized bed systems particulate solids are contacted with a gas stream in such a manner that the solids are supported by the gas stream; consequently the resulting suspended solids exhibit many of the properties of a fluid. A typical fluidized bed reactor is comprised of a vertically disposed chamber into which solids are fed, a fluidizing gas is introduced at the bottom at such a rate that the solids are suspended, and the gases are then exhausted from the upper part of the reactor. There are many advantages in conducting gas-solids reactions in such a manner as to fluidize the solids, including the general ones of high contact efficiency, close temperature control, and high heat and mass transfer rates. However, there are several disadvantages inherent in the prior art fluidized reactors. First, the bed depth is severely limited. For instance, in the field of uranium processing the greatest bed depth consistent with stable operation is in the range of four to five bed-diameters. When a deeper bed is fluidized, large bubbles appear at the top before the bottom can be fluidized. In one typical experiment using 20–40 mesh $UO_3$ particles, a bed 10 diameters deep expanded 25 percent before complete fluidization was attained while the same diameter bed only four diameters deep expanded only two percent in attaining complete fluidization. The employment of beds deeper than 10 diameters results in violent eruptions with consequent inefficient contacting.

A second disadvantage of the prior art reactors lies in the relatively high degree of intermixing of the feed and product streams and the resulting loss in efficiency in continuous processes.

It is one object of my invention to provide a fluidized bed reactor which will overcome the foregoing disadvantages of the prior art reactors.

Another object is to provide a fluidized bed reactor which will achieve highly efficient gas-solids reactions in a relatively deep bed of solids.

Another object of my invention is to provide a reactor which will enable deep beds of solids to be fluidized with only a slight amount of bed expansion in changing from the at-rest state to a fluidized state.

Another object of my invention is to provide a fluidized bed reactor for a continuous process of reacting a solid with a gas wherein the intermixing of the solid feed and product streams is low.

Other objects of my invention will become apparent from the following detailed description.

In accordance with my invention, I have provided a reactor for contacting particulate solids with a fluidizing gas comprising a vessel having walls defining a fluidizing zone, said fluidizing zone having solids inlet and outlet means, lower gas inlet means, upper gas outlet means, and means for maintaining a substantially constant gas velocity through said fluidizing zone.

In carrying out a gas-solids reaction in my reactor a stable operation is maintained even with relatively deep beds of solids, and the intermixing of feed and product streams in a continuous process is minimized.

As the flow of a fluidizing gas being passed into a bed of particulate solids is increased, the bed pressure drop increases and at some point in the pressure drop the particles on the surface start in motion. Further increase in gas flow is accompanied by an additional bed pressure drop until, at the time the pressure drop is approximately equal to the bed weight, bubbles appear on the bottom. The bed is considered as fluidized when the pressure drop is equal to the bed weight per unit area.

The reduction in gas pressure as the fluidizing gas passes through the bed results in an expansion of the gas which, in the prior art reactors, is accompanied by an increase in the gas velocity. It is believed that this velocity increase is the basic cause for the non-linear expansion of solids found in deep beds.

While there are various means by which the gas velocity may be maintained substantially constant, such as cooling means in heat-exchange relationship with the fluidizing gas, or suitably spaced ports in the wall of the fluidizing chamber through which a portion of the fluidizing gas can be evacuated, in the preferred embodiment of my reactor the walls defining the fluidizing zone are provided with a slight taper which increases the cross-section area of said zone to approximately the same extent that the gas pressure drops; thus the linear velocity of the gas remains substantially constant and consequently the fluidizing of the solids is uniform. The angle of taper which is necessary to achieve greatly improved fluidization characteristics is very small. For instance, in fluidizing $UO_3$ particles the preferred angle of taper is in the range of from ¼ to ¾ degree. While it is obvious that, for any specific case, providing a small arbitrarily-determined taper will make the velocity profile more uniform and thus achieve the result of more uniform fluidizing than is possible with a fluidizing chamber having vertical walls, such as a cylindrical reactor, an exceptionally high degree of uniformity of fluidizing can be achieved by selecting an angle which will result in virtually no change in gas velocity as the gas passes from the lower to the upper portion of the reactor. The degree of expansion of the gas and thus the change in gas velocity in a cylindrical reactor is related to the total gas pressure as well as the pressure drop. The optimum angle of taper may be found by the expression:

$$\tan \phi = D_t/2h \left[ 1 - \left( \frac{1}{1+\frac{h\Delta p}{P_t}} \right)^{\frac{1}{2}} \right]$$

where:
$\phi$ = cone angle from vertical,
$D_t$ = diameter of the fluidizing zone at the top, in feet,
$h$ = height of the fluidizing zone, in feet,
$\Delta p$ = change in pressure through the fluidizing zone, in pounds per square inch per foot, and
$P_t$ = fluidizing zone discharge pressure, pounds per square inch.

The diameter of the bottom of the fluidizing zone may be determined by the expression:

$$D_b = D_t \left[ \frac{1}{1+\frac{h\Delta p}{P_t}} \right]^{\frac{1}{2}}$$

where $D_b$ = diameter of the fluidizing zone at the bottom, in feet.

Typically the optimum angle of taper will vary from as little as 0.1 degree for particles of relatively small size and low density, such as −325 mesh ammonium diuranate particles having a specific gravity of 0.8, to as great as 0.75 degree for particles of relatively large size and high density such as 10–20 mesh $UO_3$ having a specific gravity of 4.5. For example, the optimum taper for a reactor processing pelleted $UO_3$ particles having a density of 4.0 and within the size range of 20 mesh to 40 mesh is approximately ¼ to ¾ degree from the vertical.

It is obvious that if the taper is too large, i.e., over approxmiately one degree, the rate of gas flow which is just adequate to fluidize the particles in the upper portion of the reactor will be too great in the region of small cross-section area and will cause a high turbulence in that portion.

Figure 1:
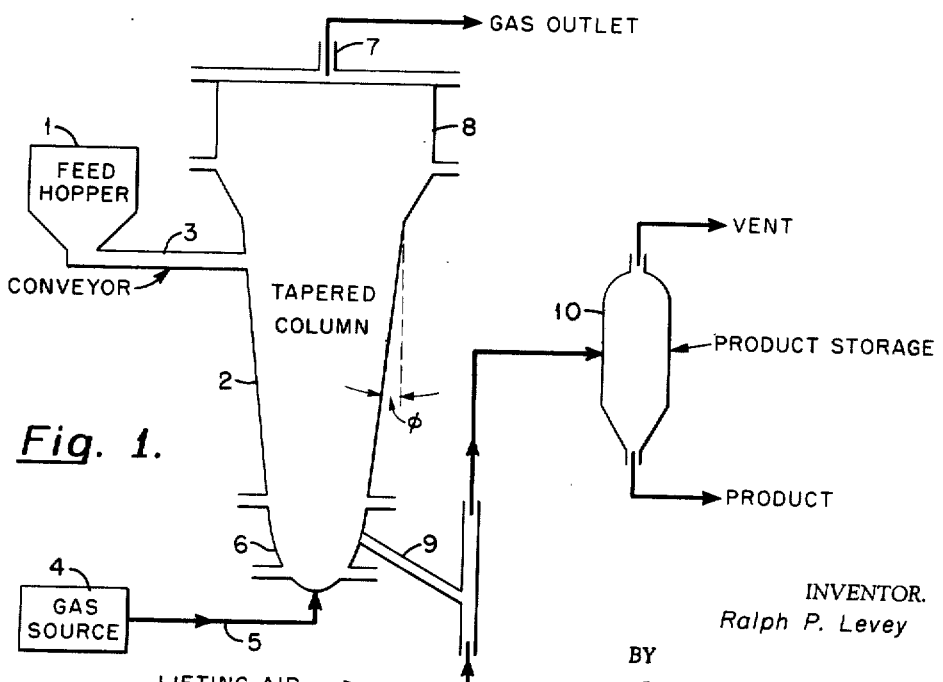

Referring to FIGURE 1, which shows one embodiment of my improved fluidizing system which is designed for a continuous process, solids feed storage 1 communicates with the fluidizing zone 2 of the reactor by means of a conveyor 3. The source of fluidizing gas 4 communicates with the lower zone 6 of the reactor by conduit means 5. The fluidizing gas vent 7 is in the upper zone 8 of the reactor. The solids removal conduit 9 communicates with the product storage 10.

In operation the particulate solids are fed from the solids feed storage 1 by the conveyor 3 into the fluidizing zone 2 while the fluidizing gas is supplied from the gas source 4 at a rate sufficient to fluidize the solids. The processed solids are removed through the conduit 9 and are lifted to storage 10.

Having thus described my invention, I offer the following examples to illustrate my invention in greater detail. Examples I, II and IV demonstrate the conditions of a fluidizing process using a conventional prior art fluidizing reactor and Examples III and V demonstrate the superior process conditions using my improved fluidized bed reactor.

Example I

A cylindrical reaction vessel 5 inches in diameter and 72 inches high provided with a gas distribution plate in the bottom and gas outlet means at the top was filled to a depth of 50 inches with 65 to 100 mesh $UO_3$. Gas was introduced at the bottom and the gas velocity at the bed exit and the amount of expansion of the bed were measured. The bed measured 62 inches deep at the lowest gas velocity at which the bed was fluidized for a bed expansion of approximately 25 percent.

Example II

A second fluidizing run was made in the vessel of Example I with a bed 20 inches deep at rest. The fluidized bed measured 20.4 inches deep for a bed expansion of approximately two percent.

As can be seen by a comparison of the data of Example I with that of Example II, in a conventional prior art fluidized reactor a moderate increase in the depth of a bed of solids to be fluidized results in a substantial increase in the percent of bed expansion upon fluidization.

Example III

A 72 inch reaction vessel 5 inches in diameter at the top and 4 inches in diameter at the bottom (taper angle =24 min.) was filled to a depth of 50 inches with the $UO_3$ of Example I and a fluidizing run identical to that of Example I was made. The bed measured approximately 50.5 inches deep at the lowest fluidizing velocity for a bed expansion of approximately 1 percent.

The data of Examples I, II and III are plotted in FIG. 2. As can be seen from the data of the above examples, the expansion of a bed of solids upon being fluidized is considerably less in my reactor than in convention vertical reactors even with relatively deep beds of solids.

Example IV

A five inch diameter cylindrical column was filled five feet deep at rest with 20–40 mesh $UO_3$ having a density of 4.2 grams per cubic centimeter. It was fed (maintaining constant inventory) with $UO_3$ containing 10 percent $UO_2$ of approximately equal size and density. The bed was fluidized with an inert gas and product was removed. The concentration of $UO_2$ in the product stream was measured at intervals. $UO_2$ appeared in the product stream in significant quantities within about 5 percent of the time required to remove one reactor column of particles, i.e., within 5 percent of the turnover time. At approximately 30 percent of the turnover time the concentration of $UO_2$ in the product was 20 percent.

Example V

A tapered column having a 5 inch diameter at the bottom and 6 inch diameter at the top filled with $UO_3$ five feet deep at rest was fed with $UO_3$ containing 10 percent $UO_2$ at a rate such that the turnover time was equal to that in the Example IV (3.14 hours). The $UO_3$ and $UO_2$ particles had the same physical characteristics as those of Example IV. Analysis of the product showed that no $UO_2$ appeared in the product until approximately 30 percent of the turnover time had elapsed.

Figure 3:
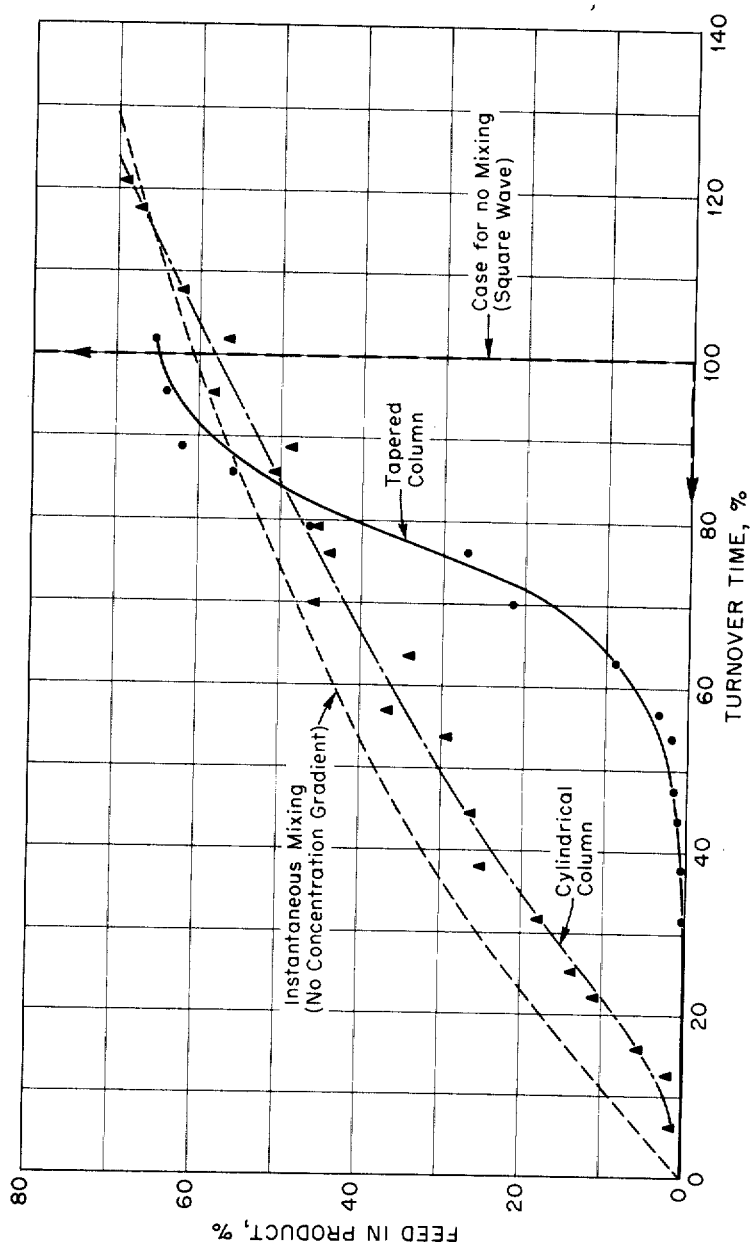

The data of Examples IV and V are plotted in FIG. 3. As can be seen from the data of Examples IV and V, the degree of mixing of feed and product streams in my tapered reactor is low compared to the degree of mixing in a conventional reactor.

It is obvious that conventional fluidized reactor accessories such as means for feeding and removing gas and solids and heating and cooling means may be used with my reactor. It is also obvious that my reactor can be used advantageously for either batch or continuous processes, and that for a continuous process the reactor may be constructed for contacting of the solids with gas in either counter-current or co-current fashion.

The above examples are intended to merely illustrate my invention, and it is intended that my invention be limited only as indicated by the appended claims.

Having thus described my invention, I claim:

1. An improved system for contacting particulate solids with a fluidizing gas comprising a vessel having walls defining a fluidizing zone, said walls being sloped upwardly at an outward angle of from 0.1 to 1 degree, said fluidizing zone having solids inlet and exit means and lower inlet gas means and upper gas outlet means.

2. The system of claim 1 wherein the walls defining said fluidizing zone are sloped outwardly at approximately ¼ to ¾ degree.

3. In a fluidizing process wherein a bed of particulate solids is established, and a gas is forced upwards through said bed at a rate sufficient to fluidize said particles, the molar quantity of said gas being constant in passing through said bed, the improvement wherein said bed is established in accordance with the relationship $$D_b = D_t \left[ \frac{1}{1 + \frac{h \Delta p}{P_t}} \right]^{\frac{1}{2}}$$

where $D_b$=the diameter of the bed at the bottom, in feet,
$D_t$=the diameter of the bed at the top, in feet,
$h$=the height of the bed, in feet,
$\Delta p$=change in pressure through the bed, in pounds per square inch per foot, and
$P_t$=pressure of gas at top of bed, in pounds per square inch.

References Cited by the Examiner

UNITED STATES PATENTS

| | | |
|---|---|---|
| 2,485,604 | 10/1949 | Kalbach. |
| 3,002,805 | 10/1961 | Browning et al. _____ 23—284 |
| 3,043,652 | 7/1962 | Schytil _____ 23—288.3 |

OSCAR R. VERTIZ, *Primary Examiner.*

GEORGE D. MITCHELL, MAURICE A. BRINDISI, ROGER L. CAMPBELL, CARL D. QUARFORTH, *Examiners.*

O. J. MEEGAN, M. N. MELLER, J. D. VOIGHT, *Assistant Examiners.*